(12) United States Patent
Zunzer

(10) Patent No.: US 12,240,297 B2
(45) Date of Patent: Mar. 4, 2025

(54) OPENABLE VEHICLE ROOF WITH ROOF CUT-OUT AND SEALING ARRANGEMENT

(71) Applicant: Webasto SE, Stockdorf (DE)

(72) Inventor: Andreas Josef Zunzer, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 379 days.

(21) Appl. No.: 17/859,437

(22) Filed: Jul. 7, 2022

(65) Prior Publication Data

US 2023/0011405 A1     Jan. 12, 2023

(30) Foreign Application Priority Data

Jul. 8, 2021   (DE) ............ 10 2021 117 708.1

(51) Int. Cl.
| | |
|---|---|
| *B60J 10/18* | (2016.01) |
| *B60J 10/246* | (2016.01) |
| *B60J 10/82* | (2016.01) |

(52) U.S. Cl.
CPC ............. *B60J 10/82* (2016.02); *B60J 10/18* (2016.02); *B60J 10/246* (2016.02)

(58) Field of Classification Search
CPC ..... B60J 7/02; B60J 7/022; B60J 7/043; B60J 7/047; B60J 7/053; B60J 7/1642; B60J 10/18; B60J 10/246; B60J 10/82; B60J 10/90
USPC ................. 296/218, 220.01, 222, 216.04
See application file for complete search history.

(56) References Cited

U.S. PATENT DOCUMENTS

| | | | | |
|---|---|---|---|---|
| 5,234,250 A * | 8/1993 | Hattass | ............... | B60J 10/82 49/490.1 |
| 5,538,317 A * | 7/1996 | Brocke | ............... | B60J 10/82 49/490.1 |
| 7,762,624 B2 * | 7/2010 | Faerber | ............... | B60J 7/0046 296/223 |

(Continued)

FOREIGN PATENT DOCUMENTS

| | | |
|---|---|---|
| CN | 103568792 A | 2/2014 |
| CN | 206623662 U | 11/2017 |

(Continued)

OTHER PUBLICATIONS

Office Action issued in corresponding Chinese Application No. 202210805932.8; mailed Dec. 13, 2024; In Chinese with English translation (24 pages).

*Primary Examiner* — Gregory A Blankenship
(74) *Attorney, Agent, or Firm* — Fitch, Even, Tabin & Flannery, LLP

(57) ABSTRACT

Vehicle roof having a roof skin which encloses a roof cutout, in which a fixed roof element and a roof opening are formed, by an inner edge and to a roof opening system having a lid element and displacement kinematics. On the inner edge of the roof skin, a weatherstrip arrangement is disposed which has a longitudinal leg and a front transverse leg and a rear transverse leg on either side. Starting from the front transverse leg, the longitudinal legs each comprise a first profile portion and a second profile portion, which interacts with the fixed roof element and is wider than the first profile portion. The longitudinal legs each comprise a third profile portion, which is disposed rearward of the second profile portion. The third profile portion is narrower than the second profile portion and transitions into the rear transverse leg.

16 Claims, 8 Drawing Sheets

(56) References Cited

U.S. PATENT DOCUMENTS

| | | | |
|---|---|---|---|
| 9,114,689 B2* | 8/2015 | Dietl | B60J 7/047 |
| 9,981,539 B1* | 5/2018 | Gill | B60J 10/18 |
| 10,358,020 B2* | 7/2019 | Coria | B60J 10/23 |
| 11,577,594 B2* | 2/2023 | Zunzer | B60J 7/02 |
| 11,654,758 B2* | 5/2023 | Zunzer | B60J 10/277 |
| | | | 296/216.09 |
| 11,820,212 B2* | 11/2023 | Hu | B60J 7/057 |
| 11,827,276 B2* | 11/2023 | Zunzer | B62D 29/043 |
| 11,958,343 B2* | 4/2024 | Schuster | B60J 10/82 |
| 2012/0112498 A1* | 5/2012 | Kikuchi | B60J 10/82 |
| | | | 296/221 |
| 2013/0307296 A1* | 11/2013 | Sawada | B60J 7/0435 |
| | | | 296/222 |
| 2014/0035328 A1 | 2/2014 | Schulz | |
| 2014/0203597 A1* | 7/2014 | Kikuchi | B60J 7/0435 |
| | | | 296/222 |
| 2015/0151617 A1* | 6/2015 | Um | B60J 7/043 |
| | | | 296/216.07 |
| 2017/0015184 A1* | 1/2017 | Sawada | B60J 10/90 |
| 2017/0240035 A1* | 8/2017 | Allali | B60J 10/90 |
| 2018/0111465 A1* | 4/2018 | Hall | B60J 10/248 |
| 2018/0272850 A1* | 9/2018 | Katsuyoshi | B60J 7/047 |
| 2020/0298692 A1* | 9/2020 | Swinkels | B60J 10/248 |
| 2021/0078394 A1 | 3/2021 | Adam | |
| 2021/0197652 A1* | 7/2021 | Shoji | B60J 10/27 |
| 2022/0194191 A1* | 6/2022 | Zunzer | B60J 10/82 |
| 2022/0281299 A1* | 9/2022 | Takahashi | B60J 7/0435 |
| 2023/0011405 A1* | 1/2023 | Zunzer | B60J 10/246 |
| 2023/0067519 A1* | 3/2023 | Zunzer | B62D 25/06 |
| 2023/0347724 A1* | 11/2023 | Runyan | B60J 10/82 |
| 2023/0406081 A1* | 12/2023 | Schreiber | B60J 7/1642 |
| 2024/0116343 A1* | 4/2024 | Chiu | B60J 10/15 |
| 2024/0239167 A1* | 7/2024 | Sch?Ufler | B60J 7/04 |

FOREIGN PATENT DOCUMENTS

| | | |
|---|---|---|
| CN | 207670165 U | 7/2018 |
| CN | 112498071 A | 3/2021 |
| DE | 102015011639 A1 | 3/2017 |
| DE | 202017105940 U1 | 11/2017 |
| DE | 102019003406 A1 | 11/2020 |
| DE | 102019131461 A1 | 5/2021 |

* cited by examiner

OPENABLE VEHICLE ROOF WITH ROOF CUT-OUT AND SEALING ARRANGEMENT

CROSS-REFERENCE TO RELATED APPLICATION

This application claims priority from German Patent Application Number DE 10 2021 117 708.1, filed Jul. 8, 2021, which is hereby incorporated herein by reference in its entirety for all purposes.

FIELD

The invention relates to an openable vehicle roof having the features of the preamble of claim 1.

BACKGROUND

A vehicle roof of this kind is known from practice and is in particular configured as a panoramic roof of a passenger car. The panoramic roof has a roof skin which forms a fixed roof portion and encloses a roof cutout in a frame-like manner. A unit which comprises a fixed roof element, which is formed by a flat transparent glass panel and to which a roof opening is adjacent at the front, is accommodated in the roof cutout. Furthermore, the unit comprises a roof opening system which has a lid element which is displaceable by means of displacement kinematics between a closed position, in which the roof opening is closed, and an open opposition, in which the roof opening is at least partly open. When the lid element is displaced from the closed position, it is moved over the fixed roof element. The displacement kinematics comprise a tilting lever on either side of the vertical longitudinal center plane which is moved along a respective lateral edge in a respective guide rail during the opening process. On the inner edge of the roof skin, a circumferential frame-like weatherstrip arrangement is disposed which forms a transition between the roof skin and the insert or the lid element and the fixed roof element of the unit. The area which is disposed above the guide rail between the roof skin and the fixed roof element is sealed by means of the weatherstrip arrangement. This area of the weatherstrip arrangement is being deformed when the lid element is displaced by the respective tilting lever and is wider in the transverse vehicle direction than the area of the weatherstrip arrangement which interacts with the lid element. The longitudinal legs of the weatherstrip arrangement also have profile portions whose diameter differ in the transverse roof direction. In a vehicle roof known from Patent Document DE 20 2017 105 940 U1, the wide profile portion assigned to the fixed roof element extends to a rear transverse leg of the weatherstrip arrangement. However, the width of the weatherstrip arrangement comes at the expense of the optical appearance of the resulting vehicle roof.

SUMMARY

The object of the invention is to provide an openable vehicle roof of the kind described above in which the width of the weatherstrip arrangement is ideally adapted to the technical requirements.

According to the invention, this object is attained by the openable vehicle roof having the features of claim 1.

According to the invention, an openable vehicle roof is proposed which comprises a fixed roof element and a lid element by means of which a roof opening disposed in particular forward of the fixed roof element can be closed. To seal a transition between the fixed roof element and the lid element on one side and a roof skin on the other side, a weatherstrip arrangement is provided which is formed in a frame-like manner and comprises a longitudinal leg, which is divided into three profile portions, on either side of a vertical longitudinal center roof plane. A first profile portion, which is disposed at the front, interacts with the lid element. A second profile portion interacts with the fixed roof element and seals in particular an area through which a tilting lever of displacement kinematics is moved when the lid element is being tilted. A third profile portion, which is disposed to the rear of the second profile portion, also interacts with the fixed roof element, but is disposed outside of the area in which the respective tilting lever of the displacement kinematics is moved when the lid element is being moved. Thus, the wide second profile portion can be kept short and correspond to no more than the length required by the displacement kinematics when the lid element is being displaced. By means of the narrow design of the third profile portion, it is also possible to continue the weatherstrip arrangement with a consistent weatherstrip profile cross section in the rear transverse leg. The required arc shape of the weatherstrip profile could not be realized easily using the wide profile portion.

The weatherstrip arrangement of the openable vehicle roof according to the invention is in particular attached to a roof frame or to webs or ribs of guide rails, which are formed on a roof frame. The fixed roof element is preferably connected to the guide rail or the roof frame via a polyurethane edge foam. The weatherstrip arrangement according to the invention abuts against the edge foam. In the area of the third profile portion of the weatherstrip arrangement in the transverse vehicle direction, the edge foam is preferably wider than in the area of the second profile portion.

In a preferred embodiment of the openable vehicle roof according to the invention, the weatherstrip arrangement comprises four profile elements of which a first profile element forms the first profile portions of the longitudinal legs and the front transverse leg, a second profile element forms the third profile portions of the longitudinal legs and the rear transverse leg, and a third profile element and a fourth profile element form the two second profile portions of the longitudinal legs.

In a preferred embodiment of the openable vehicle roof according to the invention, the third profile portions of the longitudinal legs have a cross section which corresponds to the cross section of the first profile portions of the respective longitudinal leg to keep the tooling costs for manufacturing the profile portions low. In the embodiment comprising four profile elements, the first profile element and the second profile element can thus be manufactured using the same extrusion tool.

To realize a harmonious transition between the profile portions of the longitudinal legs, the longitudinal legs of the weatherstrip arrangement each comprise a front molded part, which is disposed between the respective first profile portion and the respective second profile portion, and a rear molded part, which is disposed between the respective second profile portion and the respective third profile portion, the front molded parts and the rear molded parts each defining a continuous transition between the respective profile portions.

Preferably, the molded parts are each vulcanized or injection-molded onto the profile portions. For example, they are made of an EPDM material or a TPV material. To also keep the tooling costs for manufacturing the molded parts low, it is advantageous if the front molded part of one longitudinal leg corresponds to the rear molded part of the other longitudinal leg. Thus, these two molded parts are identical parts, the front molded parts being formed symmetrical to each other relative to the vertical longitudinal center roof plane.

Furthermore, in a specific embodiment of the vehicle roof according to the invention, the profile portions each comprise a weatherstrip head, which forms the actual sealing area and which can be a hollow chamber seal, and a weatherstrip base, which has a slot, into which a holding rib of a roof frame engages. The weatherstrip base is made of an EPDM material, for example, in particular an EPDM solid rubber, whereas the weather-strip head can be made of a cellular rubber, such as EPDM cellular rubber.

To form the first profile portions of the longitudinal legs, which interact with the lid element, as narrowly as possible, they each comprise an insert, which is formed strip-like and extends in the longitudinal direction and the vertical direction relative to the respective longitudinal leg and which is preferably made of metal in a specific embodiment of the vehicle roof according to the invention. The insert provides the necessary stiffness and dimensional stability for the profile portion. The insert allows the first profile portion to stand on a roof frame with a respective weatherstrip base, the weather-strip base being slot-free and groove-free on the underside and being configured to be clamped between two holding ribs of the roof frame. A weatherstrip head is disposed on the weatherstrip base.

To also be able to guide the weatherstrip areas of the weatherstrip arrangement in a dimensionally stable manner in the corner areas of the cutout of the roof skin, the weatherstrip arrangement has a corner area between each of the longitudinal legs and the transverse legs, each corner area being provided with a supporting element, which is molded onto the weatherstrip arrangement. The supporting element can be provided with a water outlet opening.

In particular, the supporting element can comprise a corner piece which is arc-shaped and follows a curvature of a weatherstrip head of the weatherstrip arrangement. The supporting element may replace the weatherstrip base of the profile portions in the area of the curvature since the weatherstrip base could not form the curvature cleanly because of its width. However, the corner piece inserted instead of the weatherstrip base sets the curvature.

The weatherstrip base preferably forms an outlet channel which is limited, on the one side, by the weatherstrip head and, on the other side, by a sealing lip which abuts from below against the roof skin and/or a vehicle body area to which the roof skin is fixed.

To prevent the longitudinal legs of the weatherstrip arrangement from shifting when the displacement kinematics of the roof opening system are actuated, they preferably each have a fixing device which secures at least a section of the respective longitudinal leg on the roof frame in the longitudinal direction.

In a specific embodiment of the openable vehicle roof according to the invention, the fixing device comprises a protrusion which is formed on one of the molded parts and engages in a recess of the roof frame. The protrusion works in the manner of a stop. In particular, the recess can be an interruption of a holding rib or a holding web on which the weatherstrip arrangement is mounted.

The invention also relates to an openable vehicle roof comprising a vehicle-mounted roof skin which encloses a roof cutout, in which a fixed roof element and a roof opening are formed, in a frame-like manner by means of an inner edge and the openable vehicle roof comprising a roof opening system having a lid element and displacement kinematics by means of which the lid element is displaceable between a closed position, in which the roof opening is closed, and an open position, in which the roof opening is at least partly open, a circumferential frame-like weatherstrip arrangement, which interacts with the fixed roof element and the lid element of the roof opening system, and which comprises a longitudinal leg on either side of a longitudinal center roof plane, and which has a front transverse leg and a rear transverse leg, being disposed on the inner edge of the roof skin, the longitudinal legs of the weatherstrip arrangement starting from the front transverse leg each comprising a first profile portion, which interacts with an edge of the lid element, and a second profile portion which interacts with an edge of the fixed roof element and which is wider than the first profile portion in the transverse roof direction, the first profile portions of the longitudinal legs each comprising an insert, which is formed strip-like and extends in the longitudinal direction and the vertical direction relative to the respective longitudinal leg and which is preferably made of metal.

It is obvious that this vehicle roof can also at least partly comprise any combination of the features described in connection with the vehicle roof according to claim 1.

Other advantages and advantageous configurations of the subject matter of the invention are apparent from the description, the drawing and the claims.

Exemplary configurations of an openable vehicle roof according to the invention are illustrated in a schematically simplified manner in the drawing and will be explained in more detail in the following description.

BRIEF DESCRIPTIONS OF THE DRAWINGS

DETAILED DESCRIPTION

Figure 1:
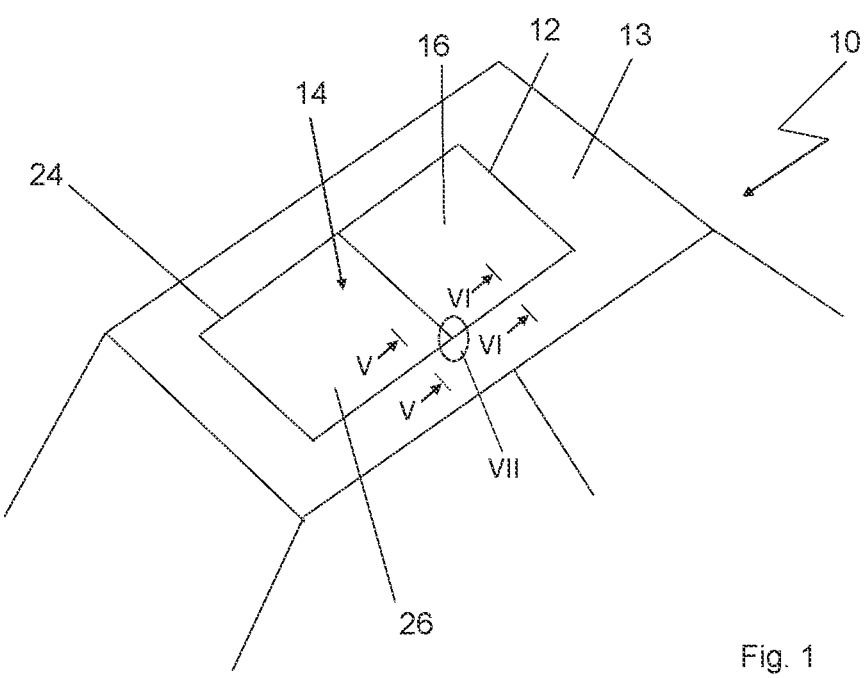
FIG. 1 is a perspective top view of a vehicle roof having a roof cutout in which a modular insert is disposed for forming a panoramic roof section.
Figure 2:
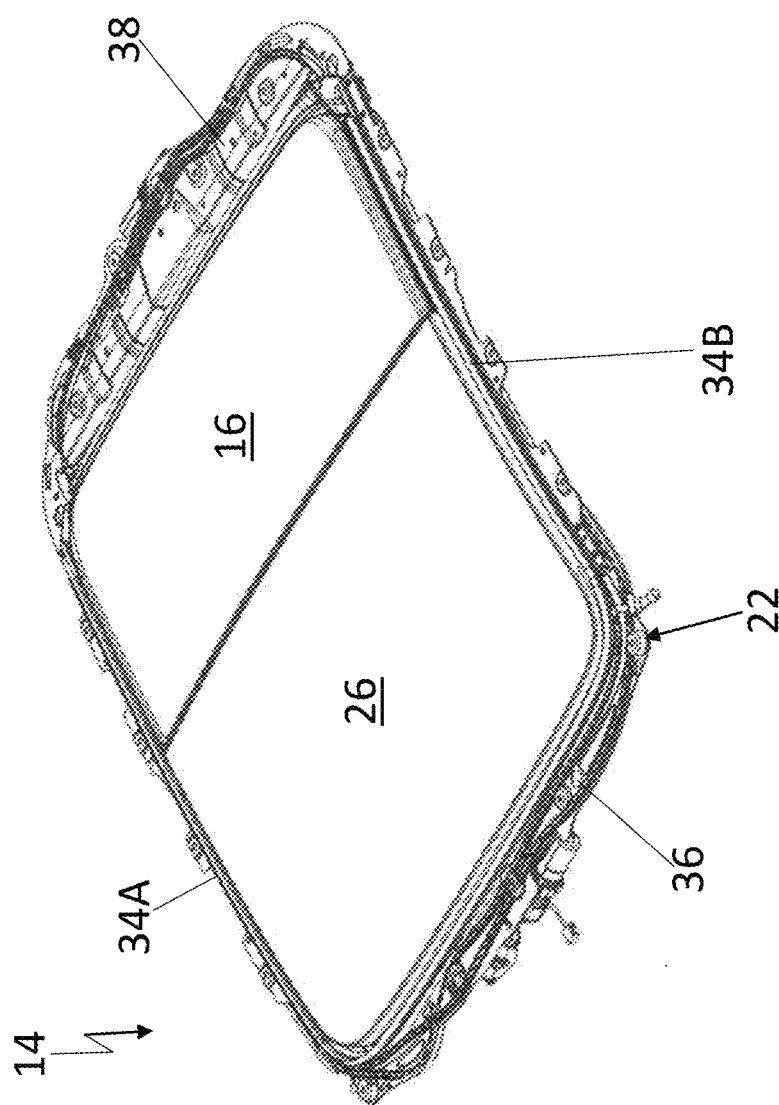
FIG. 2 is a perspective top view of the modular insert in isolation in a closed position of a lid element without weatherstrip arrangement.

FIGS. 1 to 10 show a vehicle roof 10 which is formed as a panoramic roof and has a roof cutout 12, in which a modular insert 14 is disposed.

Roof cutout 12 of vehicle roof 10 in is enclosed in a frame-like manner by roof skin 13 which is rigidly or immovably disposed relative to a vehicle body and fastened to a roof substructure 40. Insert 14 is connected to roof substructure 40 from below.

Modular insert 14 comprises a fixed roof element 16, which comprises a glass panel 18, which is provided with an edge foam 20, which is made of a polyurethane material and rigidly or immovable connects glass panel 18 to a frame 22 of insert 12.

Figure 3:
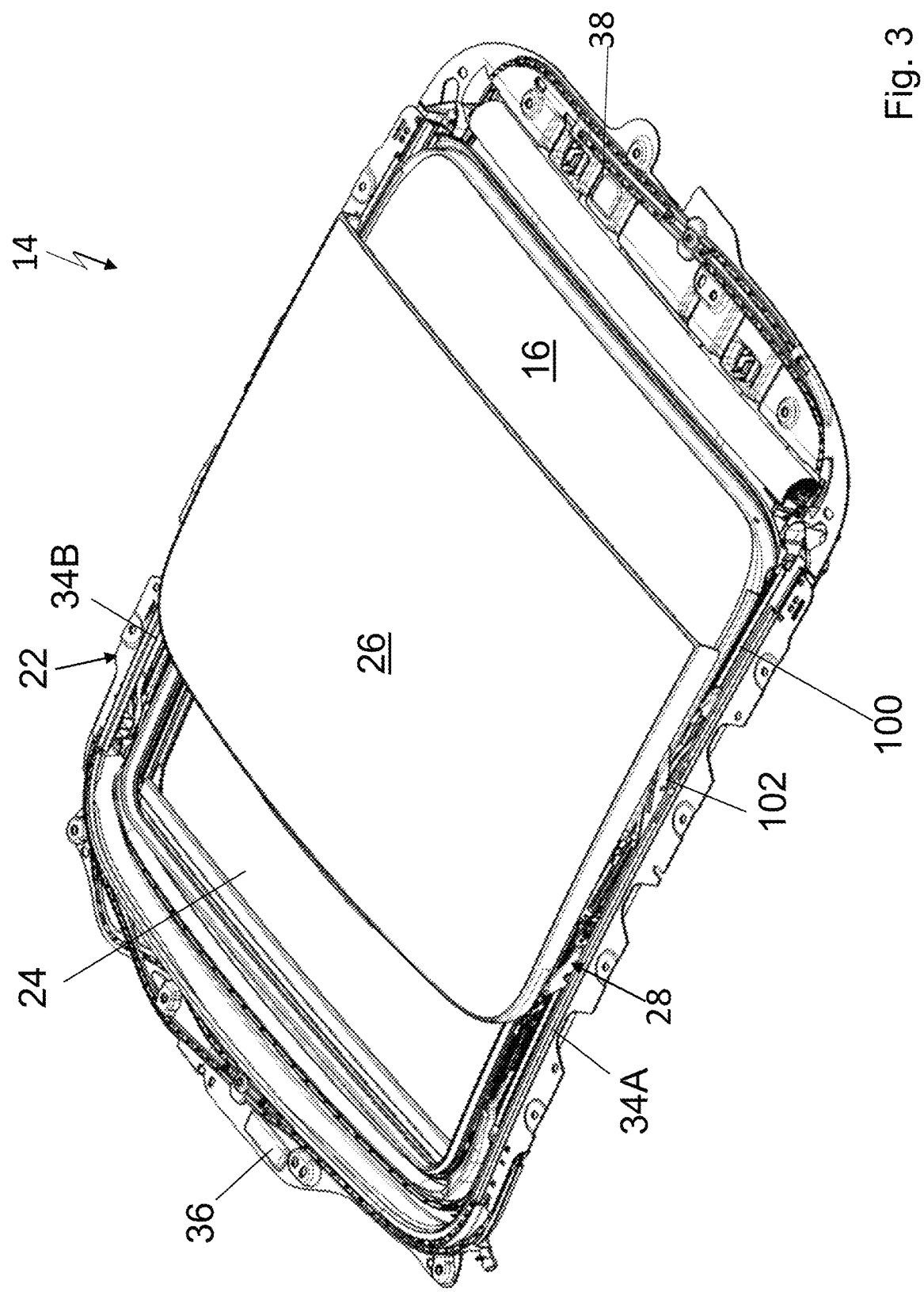
FIG. 3 is a perspective top view of the modular insert in an open position of the lid element without weatherstrip arrangement.

A roof opening 24, which can be closed by means of a displaceable lid element 26 is disposed in insert 14 and thus in roof cutout 12 forward of fixed roof element 16. The lid element can be displaced by means of displacement kinematics 28 between a closed position (illustrated in FIGS. 1 and 2), in which roof opening 24 is fully closed, and an open position, in which roof opening 24 is at least partly open (FIG. 3). In the open position, lid element 26 is disposed above fixed roof element 16. Lid element 26 also comprises a glass panel 30, which is provided with an edge foam 32 made of a polyurethane material.

Frame 22 of insert 14 comprises two longitudinal legs 34A and 34B, which extend in the longitudinal roof direction and which are connected to each other via a front transverse frame part 36 at the front and via a rear transverse frame part 38 at the rear.

Figure 4:
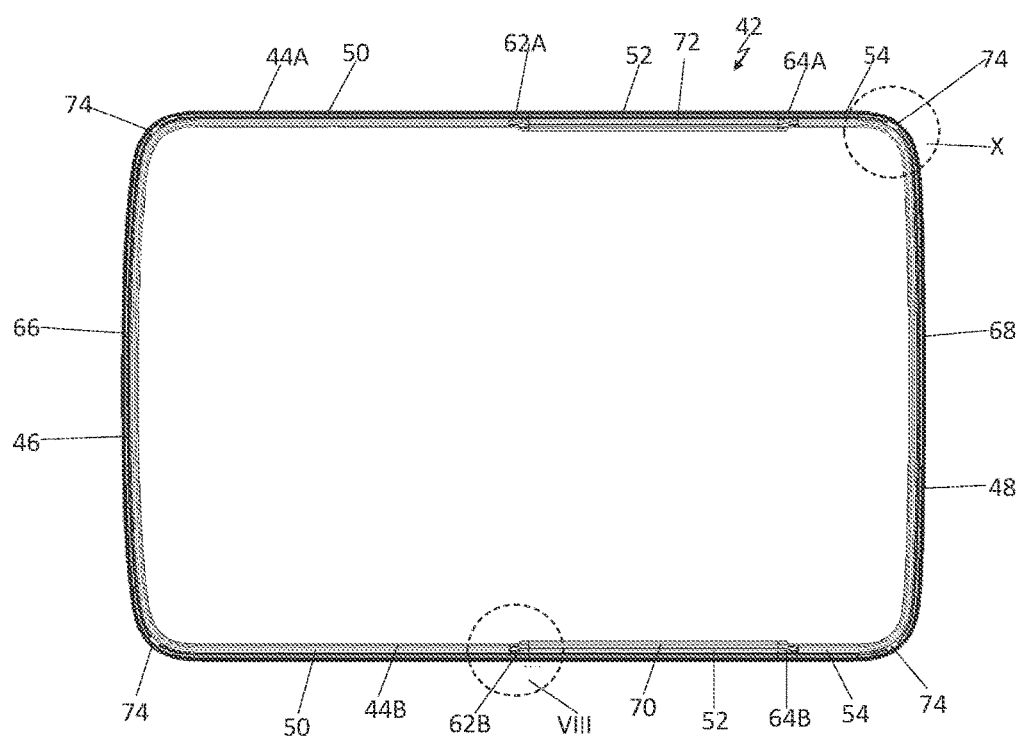
FIG. 4 is a top view of the weatherstrip arrangement which limits the roof cutout and is attached to the insert.

To seal the transition between roof skin 13 and insert 14 or its fixed roof element 16 and its lid element 26, a circumferential frame-like weatherstrip arrangement 42 is provided, which is illustrated in FIG. 4 in isolation. Weatherstrip arrangement 42 is attached to frame 22 of insert 14. On either side of the vertical longitudinal center roof plane, it comprises a longitudinal leg 44A or 44B and a front or front transverse leg 46, which connects the two longitudinal legs 44A and 44B to each other at the front, and a rear or rear transverse leg 48, which connects the two longitudinal legs 44A and 44B to each other at the rear.

Starting from front transverse leg 46 to rear transverse leg 48, longitudinal legs 44A and 44B each comprise a first profile portion 50, a second profile portion 52 and a third profile portion 54.

First profile portions 50 each interact, on the one side, with a respective inner edge 56 of roof skin 13, which defines roof cutout 12, and, on the other side, with a respective lateral edge 58 of lid element 26. Second profile portions 52 interact, on the one side, with respective inner edge 56 of roof skin 13, and, on the other side, with a respective lateral edge 60 of fixed roof element 16, which is formed by edge foam 60. Profile portions 54 also each interact with respective inner edge 56 of roof skin 13 and with respective lateral edge 60 of fixed roof element 16, which is formed by edge foam 60. Rear transverse leg 48 of weatherstrip arrangement 42 interacts with roof skin 13 and fixed roof element 16, whereas front transverse leg 46 interacts with roof skin 13 and lid element 26.

Figure 5:
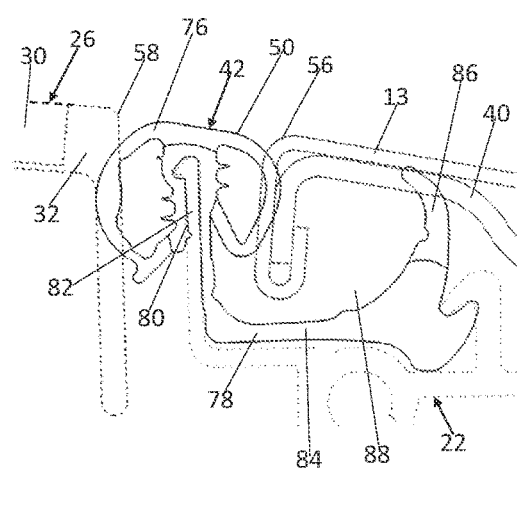
FIG. 5 is a sectional view of the vehicle roof along the line V-V in FIG. 1.
Figure 6:
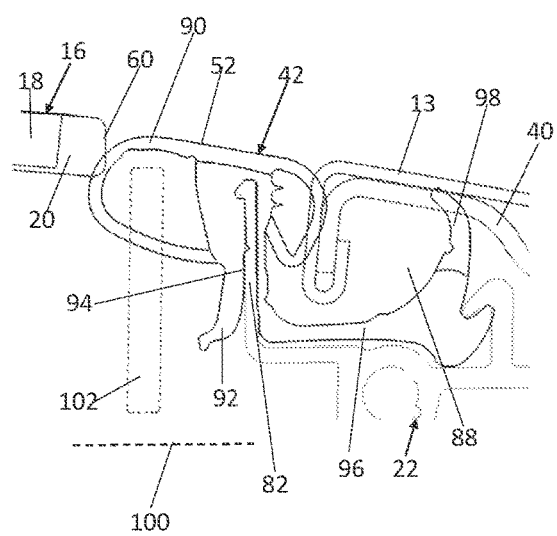
FIG. 6 is a sectional view of the vehicle roof along the line VI-VI in FIG. 1.
Figure 7:
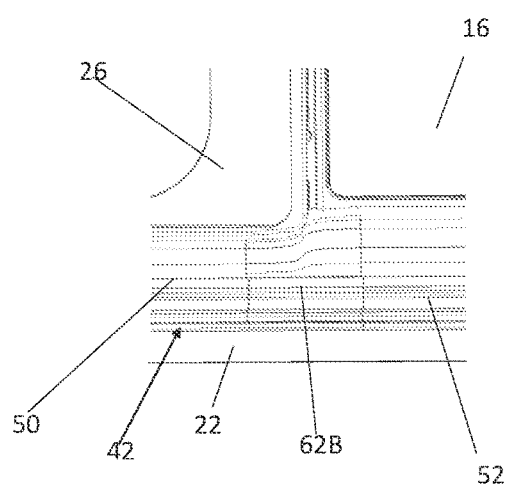
FIG. 7 is an enlarged view of the vehicle roof in the area VII in FIG. 1.
Figure 10:
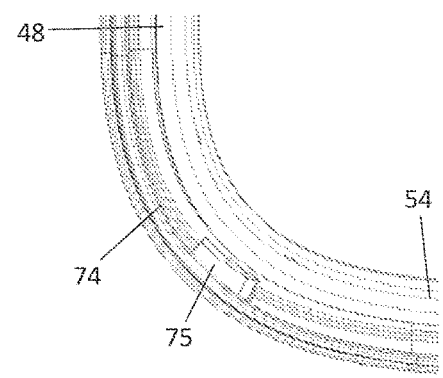
FIG. 10 is an enlarged view of the weatherstrip arrangement in an area X in FIG. 4.
Figure 8:
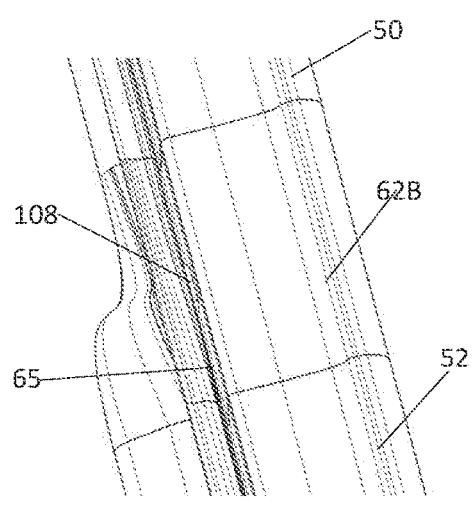
FIG. 8 is a perspective bottom view der weatherstrip arrangement in the area VIII in FIG. 4.
Figure 9:
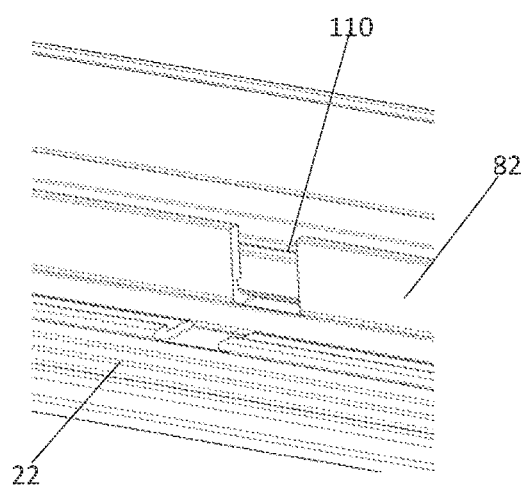
FIG. 9 is a perspective view of a guide rail of the insert in the area of a molded part of the weatherstrip arrangement.

As can be taken from FIGS. 4 to 6, second profile portions 52 are formed wider in the transverse roof direction than first profile portions 50. In turn, third profile portions 54 have the width of first profile portions 50 and are thus narrower than second profile portions 52.

To realize a continuous transition between the individual profile portions, longitudinal legs 44A and 44B each have a front molded part 62A or 62B and a rear molded part 64A or 64B. Molded parts 62A and 62B are disposed between first profile portions 50 and second profile portions 52, and molded parts 64A and 64B are disposed between second profile portions 52 and third profile portions 54 of longitudinal legs 44A and 44B. Molded parts 62A, 62B, 64A and 64B are each injection-molded or vulcanized parts and are made of a plastic material, in particular an EPDM material or a TPV material. They are connected to respective molded portions 50, 52 and 54 by vulcanization. Molded parts 62A, 62B, 64A and 64B, which each abut against edge foam 60 of fixed roof element 16, widen starting from narrower profile portion 50 or 54 towards wider profile portion 52, the transition into the profile portions taking place in a flush manner on both sides.

In the area of a slot 65, into which a holding rib 82 of frame 22 engages, each molded part 62A, 62B, 64A and 64B has a protrusion 108 which forms a stop and engages into an interruption or recess 110 of holding rib 82. Thus, longitudinal legs 34A and 34B are protected from shifting in the longitudinal direction.

In particular FIG. 4 shows that weatherstrip arrangement 42 comprises four profile elements interconnected via molded parts 62A, 62B, 64A and 64B, namely a first profile element 66, which is U-shaped in top view and forms front transverse leg 46 and the two first profile portions 50, a second profile element 68, which is also U-shaped in top view and forms rear transverse leg 48 and third profile portions 54, and a third profile element 70, which forms second profile portion 52 of longitudinal leg 44A, and a fourth profile element 72, which forms second profile portion 52 of longitudinal leg 44B. Profile elements 66 and 68 have the same cross section.

Furthermore, weatherstrip arrangement 42 comprises a supporting element 74 formed as a feature in each of its corner areas which is formed as a foamed polyurethane molded part and which is connected to the respective profile element 66 or 68 by vulcanization. Each supporting element 74 defines an arc shape of respective profile element 66 or 68 in the corner areas of weatherstrip arrangement 42 and is provided with a water outlet opening 75.

As can be seen in FIG. 5, each first profile portion 50 of weatherstrip arrangement 42 comprises a weatherstrip head 76 which is made of EPDM cellular rubber and which is formed as a tube seal and which forms the actual weatherstrip element and which interacts with roof skin 13 and lid element 26. Weatherstrip head 76 is disposed on a profile-like weatherstrip base 78 which is made of EPDM solid rubber and via which profile portion 50 is attached to respective longitudinal leg 34 of roof frame 22, which also forms a guide rail 100 for displacement kinematics 28 of the roof opening system. Weatherstrip base 58 comprises a vertical longitudinal slot 80 into which holding rib 82 of frame 22 engages. Furthermore, weatherstrip base 78 comprises a transverse leg 84, which transitions into an outer sealing lip 86, which abuts from below against roof skin 13 and/or roof substructure 40 such that a water channel 88 is formed.

Profile portions 52 also have a tube-seal-like weatherstrip head 90 made of cellular rubber, which interacts with roof skin 13 and fixed roof element 16 and which is seated on a weatherstrip base 92 made of EPDM, which has a vertical slot 94 into which holding rib 82 of frame 22 engages. Weatherstrip base 82 also has a transverse leg 96 which is limited by an outer sealing lip 98 such that profile portion 52 also forms water channel 88. Water channel 88 allows any penetrating water to be guided to supporting elements 74 in the corner areas of weatherstrip arrangement 42, from where it can be drained via outlets 75 in a suitable manner, for example via tubes which lead to wheel cases of the respective vehicle.

Second profile portions 90 of weatherstrip arrangement 42 are each disposed above guide rail 100, in which a tilting lever 102 of displacement kinematics 28 is guided in the longitudinal vehicle direction when displacing lid element 26. In this case, tilting lever 102 penetrates the slot, which is formed between inner edge 56 of roof skin 13 and respective lateral edge 60 of fixed roof element 16 and filled by the respective second profile portion 52. Weatherstrip head 90 of second profile portions 52 is being deformed or moved to the side when lid element 26 is moved by respective tilting lever 102.

Profile portions 52 extend in the direction of the rear up to a rear stop position of tilting lever 102. There, second profile portions 52 transition into the third profile portions 54 via molded parts 46A and 46B. The front molded parts 62A and 62B are disposed in the area of a parting line between fixed roof element 16 and lid element 26 in its closed position. In the basic position, molded parts 62A, 62B, 64A and 64B each abut in a form-fitting manner against edge foam 20 of glass panel 18 of fixed roof element 16, meaning edge foam 20 follows the shape of molded parts 62A, 62B, 64A and 64B.

Figure 11:
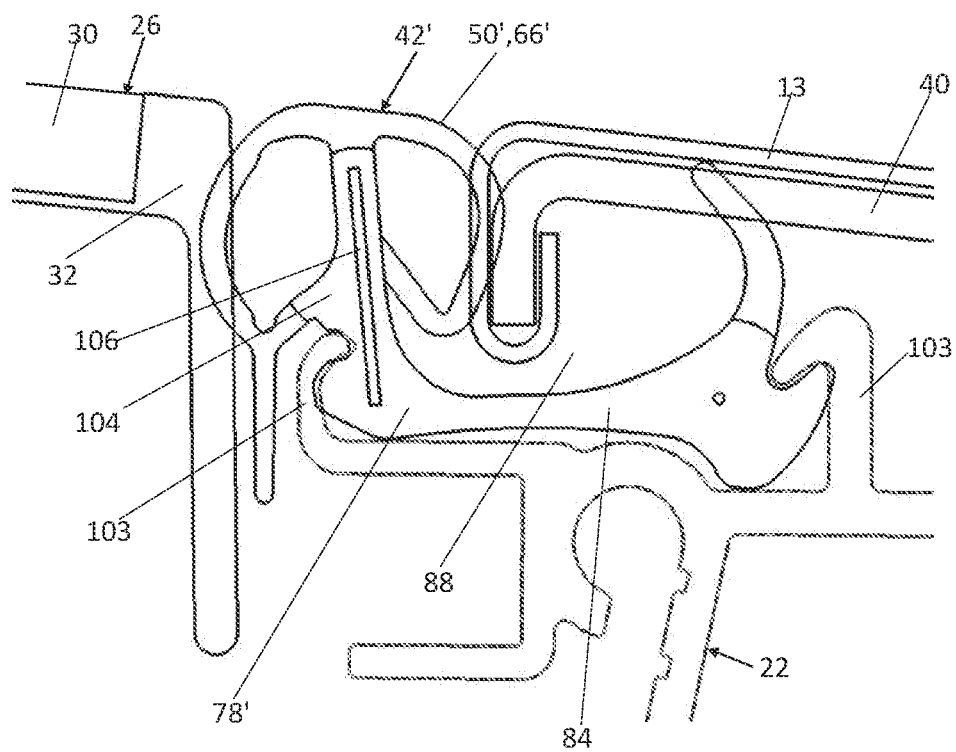
FIG. 11 is a sectional view according to FIG. 5 of an alternative embodiment of a vehicle roof according to the invention.

FIG. 11 illustrates a weatherstrip arrangement 42', which illustrates an alternative embodiment and which is different to the weatherstrip arrangement described above in that it comprises first profile portions 50' which are components of a continuous front profile element 66', which interacts with lid element 26. Profile portions 50' each comprise a weatherstrip head 76', which is formed in the manner of a tube seal and is seated on a weatherstrip base 78', via which respective profile portion 50' is fastened to roof frame 22. Weatherstrip base 78' is clamped between two longitudinal ribs 103, which are hook-shaped in cross section. Weatherstrip base 78' is slot-free and groove-free on its underside and has a strip-like metal insert 106, which is a stiffening element, in a support portion 104, to which weatherstrip head 76' is connected, such that respective profile portion 50 does not become displaced or deformed in an unintended manner because of the mechanical impact of lid element 26 when it is being displaced. A holding web, which would engage in a corresponding slot of weatherstrip base 78', can be omitted because of metal insert 106. Thus, weatherstrip head 50' can be formed so as to be narrower in comparison to an embodiment having a holding slot, which, in turn, has a positive impact on the appearance of the vehicle roof.

Apart from this, weatherstrip arrangement 42' corresponds to the embodiment according to FIGS. 1 to 10, which is why reference is made to the description above.

The invention claimed is:

1. An openable vehicle roof comprising:
 a vehicle-mounted roof skin which encloses a roof cutout, in which a fixed roof element and a roof opening are formed, in a frame-like manner by an inner edge, and
 the openable vehicle roof comprising a roof opening system having a lid element and displacement kinematics wherein the lid element is displaceable between a closed position, in which the roof opening is closed, and an open position, in which the roof opening is at least partly open,
 a circumferential frame-like weatherstrip arrangement being disposed on the inner edge of the roof skin, the weatherstrip arrangement interacting with the fixed roof element and the lid element of the roof opening system and comprising a longitudinal leg on either side of a vertical longitudinal center roof plane and having a front transverse leg and a rear transverse leg, the longitudinal legs of the weather-strip arrangement each comprising, starting from the front transverse leg, a first profile portion, which interacts with an edge of the lid element, and a second profile portion, which interacts with an edge of the fixed roof element and which is wider than the first profile portion in the transverse roof direction,
 wherein the longitudinal legs each comprise a third profile portion, which is disposed rearward of the second profile portion, the third profile portion being narrower than the second profile portion in the transverse roof direction and transitioning into the rear transverse leg.

2. The openable vehicle roof according to claim 1, wherein the weatherstrip arrangement comprises four profile elements, of which a first profile element forms the first profile portions of the longitudinal legs and the front transverse leg, a second profile element forms the third profile portions of the longitudinal legs and the rear transverse leg, and a third profile element and a fourth profile element form the second profile portions of the longitudinal legs.

3. The openable vehicle roof according to claim 1, wherein the third profile portions of the longitudinal legs each have a cross section which corresponds to the cross section of the first profile portion of the respective longitudinal leg.

4. The openable vehicle roof according to claim 1, wherein the longitudinal legs of the weatherstrip arrangement each comprise a front molded part, which is disposed between the respective first profile portion and the respective second profile portion, and a rear molded part, which is disposed between the respective second profile portion and the respective third profile portion, the front molded parts and the rear molded parts each defining a continuous transition between the respective profile portions.

5. The openable vehicle roof according to claim 4, wherein the molded parts are each formed as an injection-molded part or as a vulcanized part.

6. The openable vehicle roof according to claim 4, wherein the front molded part of the one longitudinal leg and the rear molded part of the other longitudinal leg are identical parts.

7. The openable vehicle roof according to claim 1, wherein the first profile portions of the longitudinal legs each comprise an insert, which is formed strip-like and extends in the longitudinal direction and the vertical direction relative to the respective longitudinal leg.

8. The openable vehicle roof according to claim 7, wherein the insert is accommodated by a weather-strip base on which a weatherstrip head is disposed.

9. The openable vehicle roof according to claim 1, wherein between each of the longitudinal legs and the transverse legs, the weatherstrip arrangement has a corner area which is provided with a supporting element which is molded onto the weatherstrip arrangement.

10. The openable vehicle roof according to claim 9, wherein the supporting elements each follow a curvature of a weatherstrip head of the weatherstrip arrangement.

11. The openable vehicle roof according to claim 1, wherein the profile portions each comprise a weatherstrip head and a weatherstrip base which has a slot into which a holding rib of a roof frame engages.

12. The openable vehicle roof according to claim 11, wherein the weatherstrip base forms a water channel which is limited by a sealing lip which abuts from below against the roof skin and/or a vehicle body area to which the roof skin is fixed.

13. The openable vehicle roof according to claim 1, wherein the longitudinal legs of the weatherstrip arrangement each comprise a fixing device which secures at least a section of the respective longitudinal leg on a roof frame in the longitudinal direction.

14. The openable vehicle roof according to claim 13, wherein the longitudinal legs of the weatherstrip arrangement each comprise a front molded part, which is disposed between the respective first profile portion and the respective second profile portion, and a rear molded part, which is disposed between the respective second profile portion and the respective third profile portion, the front molded parts and the rear molded parts each defining a continuous transition between the respective profile portions, wherein the fixing device comprises a protrusion which is formed on one of the molded parts and engages into a recess of the roof frame.

15. The openable vehicle roof according to claim 5, wherein the molded parts are made of a material comprising EPDM and/or TPV.

16. The openable vehicle roof according to claim 7 wherein the insert is made of metal.

* * * * *